July 6, 1926.
R. L. LASH
AUTOMATIC VALVE FOR FLUSH TANKS
Filed Sept. 26, 1925
1,591,846
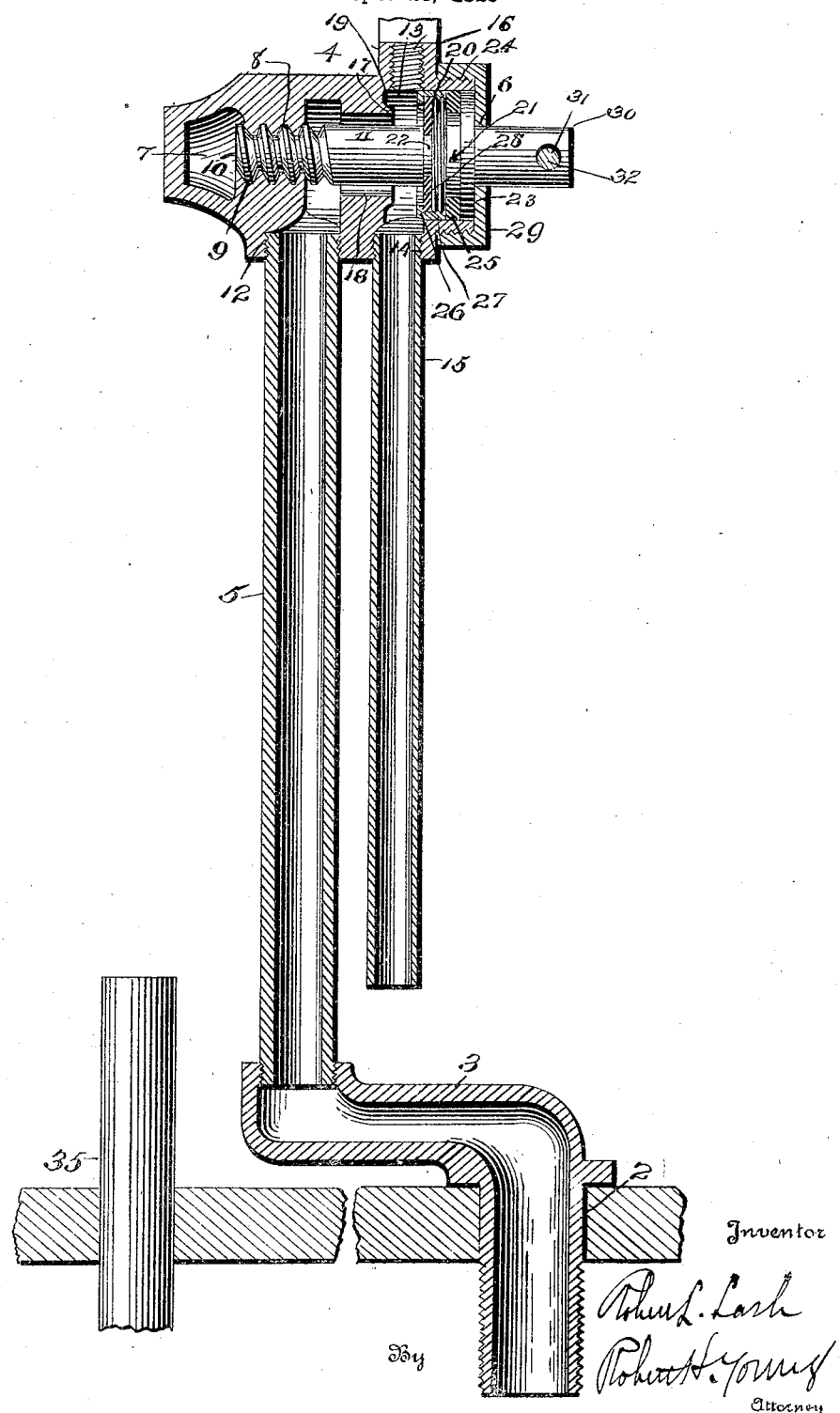
Inventor
Robert L. Lash
Robert H. Young
Attorney Patented July 6, 1926.

1,591,846

UNITED STATES PATENT OFFICE.

ROBERT L. LASH, OF NORFOLK, VIRGINIA, ASSIGNOR TO LASH-TUCHMANN VALVE CORPORATION, OF NORFOLK, VIRGINIA.

AUTOMATIC VALVE FOR FLUSH TANKS.

Application filed September 26, 1925. Serial No. 58,847.

This invention relates in general to automatic valves for flush tanks and more particularly to means for reducing the noise and splashing incident to the operation of such valves.

It is an object of my invention to provide a float controlled valve of this character readily adaptable for use in tanks of various shapes and dimensions and in which the valve is so arranged that it may be easily removed for the replacing of the gasket or washer.

It is a further object of my invention to so design my valve as to prevent leakage from the valve body and to reduce to a minimum the noise and splashing incident to the operation thereof.

Other objects of my invention will appear in the specification and claims and will be disclosed in the accompanying drawings in which—

The figure is, largely, a central vertical section through my valve chamber body.

Referring now with greater particularity to the drawing it will be seen that my device is comprised as follows:

The flush box is provided with an aperture 2 in the base through which one end of the elbow inlet pipe 3 is inserted and secured. The valve chamber body 4 is mounted on and connected to the elbow 3 by means of a straight section of tubing 5 which may be of any length desired in accordance with the height of the maximum water level desired in the flush box. The valve chamber is substantially cylindrical and has a longitudinally extending bore 6 open at one end and terminating at its other end in a recess 7 having a portion 8 thereof provided with steeply pitched screw threads 9 for the reception of the screw threaded end 10 of the valve stem 11. Radially extending bores 12, 14 and 13 are provided for reception of the inlet pipe 5, the outlet pipe 15, and the refill pipe 16, respectively. At its open end the valve chamber body is provided with external screw threads 24 the purpose of which will be described hereinafter. A valve seat surrounding the end of a comparatively restricted portion 18 of the bore 6 is provided, and a groove 19 is incut in the valve chamber around the seat.

The valve stem 11 has integrally formed therewith an enlarged externally screw-threaded valve portion 20 on opposite sides of which grooves 21 and 22 are cut into the valve stem. Towards the open end of the bore of the valve chamber body the valve stem has a disk-like portion 23 of such a diameter that it has a smooth sliding fit within the bore 6.

A washer or gasket 28 is adapted to be slipped over the screw threaded end of the valve stem and forced into the groove 22 where it is held in position secured against the valve portion 20 by a cap 27 having an inturned flange 26 for engaging the gasket and being provided with internal screw threads for securing the cap to the screw threaded portion 20 of the valve portion of the stem. A washer 25 is mounted in the groove 21 to prevent leakage past the disk portion 23. A cap 29 having a central bore to permit of the passage of the end 30 of the valve stem and having internal screw threads adapted to engage with the screw threads 24 of the valve chamber body, is provided to hold the parts in their assembled position and to provide an additional bearing for the end 30 of the valve stem. The end 30 of the stem has a diametrically extending bore 31 for the reception of the ball rod 32 which is connected to the usual flush ball, not shown.

The mouth of the outlet pipe 15 is adjacent the bottom of the flush tank and will always be positioned below the upper end of the outlet nipple 35 leading from the flush box. Thus there will always be some water standing in the pipe 15 with the result that there will be no splashing from the rush of water as the tank is being filled since the water is always entering below the level of the water in the tank.

From the foregoing the operation of my device will be seen to be as follows: The rotation of the valve stem under the influence of motion from the ball or float causes the gasket 28 to be moved toward or away from the valve seat 17 to open or close the bore 18. When the valve is open the water enters through the inlet pipe 5 passes through the bore 18 and out through the pipe 15 where it emerges under the level of the water in the flush tank preventing splashing and reducing the noise of operation. When the gasket 28 becomes worn it is merely necessary to remove the cap 29, screw the valve stem out of the screw threaded bore 8 and unscrew the cap 26. The valve which I have designed is one which may be accessibly mounted in flush tanks of any dimensions and shape since the offset elbow 3 and the pipes 5 and 15 are of standard stock and may be readily secured of the dimensions required.

I claim—

1. In combination, in a valve of the character described, a valve chamber having a longitudinal bore, inlet and outlet means communicating with said bore intermediate of the ends of said chamber, a valve movable simultaneously longitudinally and rotatively in said bore, and means for preventing leakage past the stem of said valve.

2. In combination, in a valve of the character described, a valve chamber having a longitudinal bore open at one end and terminating in a screw threaded recess at the other, inlet and outlet means communicating with said bore intermediate of the ends of said chamber, a valve having a threaded stem for engaging in said screw threaded recess whereby it is movable longitudinally and rotatively in said bore, and closure means for the open end of said bore having a bearing for the reception of the valve stem, means mounted on the stem of said valve for preventing leakage past the stem of said valve.

3. A valve including a valve stem having an enlarged screwthreaded portion intermediate of its ends, an open ended cap having an inwardly extending flange and screwthreadedly engaging said enlarged valve stem portion, and a gasket mounted on said stem and secured in position against said enlarged valve stem portion by said flange.

4. A valve including a valve stem having an enlarged screwthreaded portion intermediate of its ends, a shallow circumferential groove in said stem adjacent said enlarged portion, an open ended cap having an inwardly extending flange and screwthreadedly engaging said enlarged valve stem portion, and a gasket mounted on said stem in said groove and secured in position against said enlarged valve stem portion by said flange and groove.

5. A valve including a valve chamber having a longitudinal bore open at one end and terminating at the other in a screw threaded recess, inlet and outlet orifices intermediate of the ends of said valve chamber, a valve seat between said orifices, a valve stem having one end screwthreadedly engaging in said recess, said valve stem having an enlarged externally screw threaded portion intermediate of its ends and a circumferential groove on each side thereof, a gasket mounted in one of said grooves and movable to bear against said valve seat, an open ended cap screw threadedly engaging said enlarged valve stem portion and having an inwardly extending flange to secure said gasket in position, a gasket mounted in the other of said grooves and having a sliding fit in said bore, and a cap secured to said chamber for limiting the outward motion of said stem.

In testimony whereof I affix my signature.

ROBERT L. LASH.